United States Patent [19]

Baumann et al.

[11] Patent Number: 4,560,744
[45] Date of Patent: Dec. 24, 1985

[54] AZO DYE 2:1-CHROMIUM COMPLEXES

[75] Inventors: Hans Baumann, Wachenheim; Klaus Grychtol, Bad Durkheim, both of Fed. Rep. of Germany

[73] Assignee: BASF Aktiengesellschaft, Ludwigshafen, Fed. Rep. of Germany

[21] Appl. No.: 241,105

[22] Filed: Mar. 6, 1981

[30] Foreign Application Priority Data

Mar. 21, 1980 [DE] Fed. Rep. of Germany ....... 3010872

[51] Int. Cl.$^4$ ................... C09B 45/06; C09B 45/16; C09B 46/00; D06P 1/10
[52] U.S. Cl. .................... 534/696; 534/602; 534/695; 534/697; 534/724; 534/739; 534/780; 534/781; 534/792; 534/839; 534/840; 534/859; 534/876; 534/882; 534/883
[58] Field of Search ............. 260/145 A, 145 B; 534/696

[56] References Cited

U.S. PATENT DOCUMENTS

| | | | |
|---|---|---|---|
| 2,855,393 | 10/1958 | Schetty et al. | 260/145 |
| 3,041,327 | 6/1962 | Buehler et al. | 260/145 A |
| 3,169,951 | 2/1965 | Buehler et al. | 260/145 A |
| 3,576,796 | 4/1971 | Jirou et al. | 260/145 A |
| 3,627,747 | 12/1971 | Brouard | 260/145 A |
| 4,085,097 | 4/1978 | Beffa et al. | 260/145 |

FOREIGN PATENT DOCUMENTS

| | | | |
|---|---|---|---|
| 1040557 | 9/1964 | United Kingdom | 260/145 |
| 1123948 | 8/1968 | United Kingdom | 260/145 A |
| 1564481 | 10/1976 | United Kingdom | 260/145 |

Primary Examiner—Floyd D. Higel
Attorney, Agent, or Firm—Oblon, Fisher, Spivak, McClelland & Maier

[57] ABSTRACT

Compounds which in the form of the free acids correspond to the formula

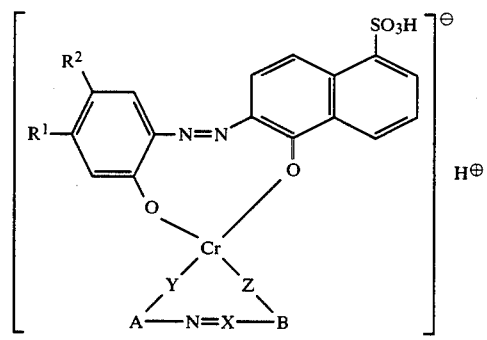

where
A is a radical of a diazo component or of an amine,
B is a radical of a coupling component or of an aldehyde,
$R^1$ is chlorine or bromine,
$R^2$ is methoxy or ethoxy,
X is =N— or =CH—,
Y is —O— or —COO— and
Z is —O— or —NH—, are dyes which are very suitable for dyeing nylons and natural polyamides.

2 Claims, No Drawings

AZO DYE 2:1-CHROMIUM COMPLEXES

The present invention relates to compounds which in the form of the free acids correspond to the general formula I

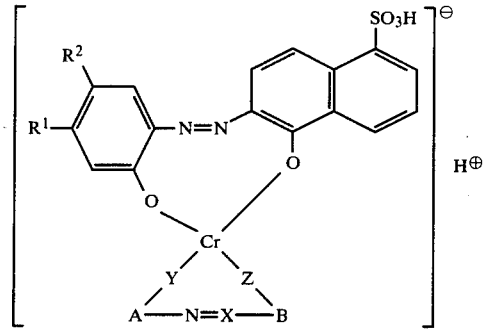

where

A is a radical of a diazo component or of an amine,
B is a radical of a coupling component or of an aldehyde,
$R^1$ is chlorine or bromine,
$R^2$ is methoxy or ethoxy,
X is =N— or =CH—,
Y is —O— or —COO— and
Z is —O— or —NH—.

The radicals of the diazo components A are in the main derived from the benzene or naphthalene series, and can carry substituents conventionally present in metal complex dyes, such as chlorine, bromine, methyl, ethyl, $C_1$–$C_4$-alkoxy, trifluoromethyl, nitro, $C_1$–$C_4$-alkylsulfonyl, phenylsulfonyl, unsubstituted or substituted carbamyl or sulfamyl, or hydroxysulfonyl.

Some examples of important diazo components

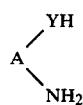

are 2-aminophenol, 4-chloro-2-aminophenol, 4- and 5-nitro-2-aminophenol, 4,6-dichloro-2-aminophenol, 4-methyl-6-nitro-2-aminophenol, 4-chloro-5-nitro-2-aminophenol, 2-aminobenzoic acid, 4-nitro-2-aminobenzoic acid, 2-aminobenzoic acid 5-sulfonic acid, 2-aminophenol-4-sulfonic acid, 2-aminophenol-4-sulfonamide, 2-aminophenol-4-sulfonic acid phenylamide, 2-aminophenol-5-sulfonic acid dimethylamide, 2-aminophenol-4-sulfonic acid γ-methoxypropylamide, 4-chloro-2-aminophenol-6-sulfonic acid, 4-nitro-2-aminophenol-6-sulfonic acid, 5- and 6-nitro-2-aminophenol-4-sulfonic acid, 1-amino-2-naphthol-4-sulfonic acid, 2-amino-1-naphthol-5-sulfonic acid, 1-amino-6-nitro-2-naphthol-4-sulfonic acid and 3,5-dichloro-2-aminophenol.

If A is a radical of an amine, it is preferably derived from an aliphatic or monocyclic aromatic amine which, in the latter case, can be substituted like the diazo component.

Examples of amines

are 1-aminoethan-2-ol, 1-aminopropan-2-ol, 1-aminopropan-3-ol, 3-amino-3-methylbutan-1-ol, 2-aminoacetic acid, 2-aminopropionic acid, 3-aminopropionic acid, 2-amino-3-hydroxypropionic acid, 2-amino-3-phenylpropionic acid, 2-aminobutyric acid, aminosuccinic acid and 2-aminoglutaric acid.

The radicals of the coupling components are in the main derived from compounds of the benzene, naphthalene, pyrazolone, acetoacetarylide, barbituric acid or pyridine series.

Specific examples of such compounds are 4-methylphenol, 3,4-dimethylphenol, 4-acetylaminophenol, 4-methyl-3-acetylaminophenol, 4-methoxyphenol, 3-diethylaminophenol, 4-methyl-3-ethylaminophenol, 3-(o-tolylamino)phenol, 2-naphthylamine, 2-naphthol, 6-bromo-2-naphthol, 8-acetylamino-2-naphthol, 5,8-dichloro-1-naphthol, 1-naphthol-5-sulfonic acid, 2-naphthol-6-sulfonic acid, 1-naphthylamine-4- and -5-sulfonic acid, 2-naphthylamine-5- and -6-sulfonic acid, 8-acetylamino-1-naphthol-5-sulfonic acid, 6-phenylamino-1-naphthol-3-sulfonic acid, 7-amino-1-naphthol-3-sulfonic acid, 3-methyl-pyrazol-5-one, 1-phenyl-3-methyl-pyrazol-5-one, 1-phenyl-5-aminopyrazole, 1,3-diphenyl-pyrazol-5-one, 1-phenyl-pyrazol-5-one-3-carboxylic acid, 1-(2'-methylphenyl)-3-methylpyrazol-5-one, 1-(4'-chlorophenyl)-3-methyl-pyrazol-5-one, 1-(2',5'-dichlorophenyl)-3-methyl-pyrazol-5-one, 1-phenyl-3-methyl-pyrazol-5-one-4'-carboxylic acid, 1-phenyl-3-methyl-pyrazol-5-one-3'- and -4'-sulfonic acid, 1,3-diphenyl-pyrazol-5-one-2'-sulfonic acid, 1-(2'-chlorophenyl)-3-methyl-pyrazol-5-one-5'-sulfonic acid, 1-(2',5'-dichlorophenyl)-3-methyl-pyrazol-5-one-4'-sulfonic acid, 2,4-dihydroxyquinoline, N-acetoacetylphenylamide, N-acetoacetylcyclohexylamide, N-acetoacetyl-(4-methylphenyl)-2-sulfonic acid, barbituric acid, N,N'-dimethylbarbituric acid, 2,6-dihydroxy-3-cyano-4-methylpyridine and 1-methyl-2-hydroxy-3-cyano-4-methylpyrid-6-one.

Examples of aldehydes

are 4-diethylaminosalicylaldehyde, 4-dimethylaminosalicylaldehyde, salicylaldehyde, 3- or 5-nitrosalicylaldehyde, 4-dibenzylaminosalicylaldehyde, β-hydroxynaphthaldehyde and 5-formyl-barbituric acid.

The compounds of the formula I may be prepared by adduct formation of a Cr-complex of the formula

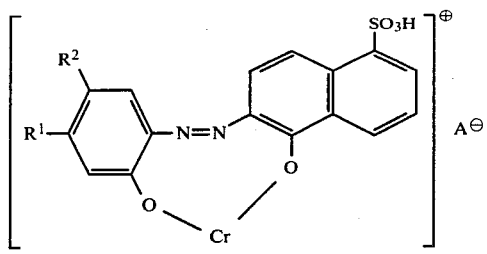

where A⊖ is an anion, with a compound of the formula

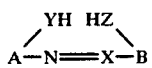

by conventional methods.

Details of the methods of preparation may be found in the Examples, where parts and percentages are by weight, unless stated otherwise.

The compounds of the formula I are particularly suitable for dyeing natural and synthetic polyamides, such as wool, silk, leather and nylon. Dark hues having very good fastness characteristics, especially very good wetfastness, are obtained.

Compounds of particular importance are those of the general formula Ia

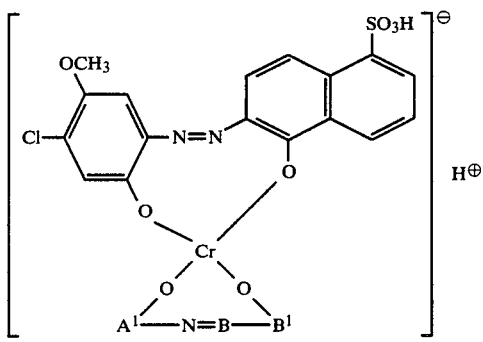

where $A^1$ is a radical of a diazo component of the benzene or naphthalene series and $B^1$ is a radical of a coupling component of the benzene, naphthalene or pyrazolone series.

Examples of particularly valuable diazo components are 2-aminophenol-4-sulfonic acid, 4-chloro-2-aminophenol-6-sulfonic acid, 4-nitro-2-aminophenol-6-sulfonic acid, 5- and 6-nitro-2-aminophenol-4-sulfonic acid, 6-nitro-2-aminophenol-4-sulfonic acid, 4- and 5-nitro-2-aminophenol, 1-amino-2-naphthol-4-sulfonic acid and 1-amino-2-naphthol-6-nitro-4-sulfonic acid.

Examples of particularly valuable coupling components are β-naphthol, 1-phenyl-3-methyl-pyrazol-5-one, acetoacetic acid anilide and 1-amino-8-hydroxynaphthalene-3,6-disulfonic acid.

EXAMPLE 1

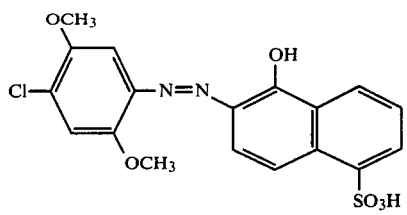

1:1 Cr—complex prepared by demethylating chroming 400 parts by volume of half-concentrated hydrochloric acid are added to 376 parts of 2-chloro-5-aminohydroquinone dimethyl ether in 2,800 parts of ice water. Diazotization is carried out by adding 620 parts by volume of 23% strength sodium nitrite solution at 0°-5° C. Excess nitrite is destroyed with amidosulfonic acid. The filtered diazo solution is run into a solution of 450 parts of 1-hydroxynaphthalene-5-sulfonic acid in 3,200 ml of ice water, 70 parts of sodium hydroxide solution and 100 parts of sodium carbonate. The coupling is complete after two hours. The pH is then brought to 1 by adding hydrochloric acid. Thereafter a solution of 300 g of chromium-(III) oxide in 300 g of formic acid and 2 liters of water is added and the mixture is heated in an autoclave at 130° C. for three hours. When it has cooled, the product is filtered off and dried. A black powder is obtained. Yield: 750 parts. The product dyes wool and leather grayish blue.

EXAMPLE 2

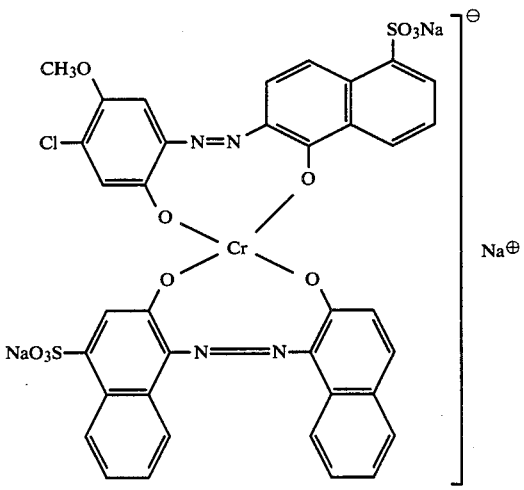

40 parts of the azo dye obtained from 1-amino-2-naphthol-4-sulfonic acid and β-naphthol and 40 parts of the 1:1-chromium complex prepared as described in Example 1, in 500 parts of water, are heated to 80° C., sodium hydroxide solution is added to bring the pH to 7.5, and the mixture is stirred for five hours. The mixture is then cooled and the product is salted out with sodium chloride. After filtration and drying, a black powder is obtained, which dyes wool and leather in reddish blue hues. The dyeings obtained have good fastness characteristics.

The Table which follows lists further dyes which, when converted to an adduct with the 1:1 complex from Example 1, give dyes with similar properties to those of the products of Examples 1 and 2.

| Ex. | Azo or azomethine dye | Hue on wool |
|---|---|---|
| 3 | (nitro-hydroxyphenyl)azo-(amino-hydroxy-disulfonaphthalene), Na salts | dark blue |
| 4 | (nitro-hydroxyphenyl)azo-acetyl-(phenylhydrazono)-methane derivative | brown |
| 5 | $(H_5C_2)_2N$–C$_6$H$_3$(OH)–CH=N–C$_2$H$_4$–OH | blue |
| 6 | (nitro-hydroxy-sulfophenyl)azo-(hydroxynaphthyl) | brown |
| 7 | (sulfo-hydroxynaphthyl)azo-(hydroxynaphthyl) | blue |
| 8 | barbituric acid azomethine with hydroxyphenyl | gray |
| 9 | (nitro-hydroxy-sulfophenyl)azo-acetoacetanilide derivative | brownish olive |
| 10 | (sulfo-hydroxynaphthyl)azo-acetyl-(phenylhydrazono)-methane | violet |
| 11 | (nitro-hydroxyphenyl)azo-(hydroxynaphthyl) | brown |
| 12 | (nitro-hydroxy-sulfophenyl)azo-acetyl-(phenylhydrazono)-methane | brown |
| 13 | (chloro-hydroxy-sulfophenyl)azo-acetoacetanilide | brown |
| 14 | (nitro-hydroxy-sulfophenyl)azomethine with hydroxynaphthyl | brown |
| 15 | (nitro-hydroxyphenyl)azo-acetyl-(phenylhydrazono)-methane | reddish brown |
| 16 | (nitro-hydroxyphenyl)azo-acetyl-(phenylhydrazono)-methane isomer | reddish brown |
| 17 | (nitro-hydroxy-sulfophenyl)azo-(diethylamino-hydroxyphenyl) | violet |
| 18 | (sulfonaphthyl)azo-(diethylamino-hydroxyphenyl), hydroxy | blue |
| 19 | (nitro-sulfo-hydroxynaphthyl)azo-(diethylamino-hydroxyphenyl) | dark blue |
| 20 | (chloro-hydroxy-sulfophenyl)azo-(hydroxynaphthyl) | violet |

| Ex. | Azo or azomethine dye | Hue on wool |
|---|---|---|
| 21 | (structure) | brown |
| 22 | (structure) | brown |
| 23 | (structure) | brown |
| 24 | (structure) | green |
| 25 | (structure) | brown |
| 26 | (structure) | reddish brown |
| 27 | (structure) | grayish blue |
| 28 | (structure) | blue |

We claim:

1. A metal complex dye, which in the form of the free acid has the formula:

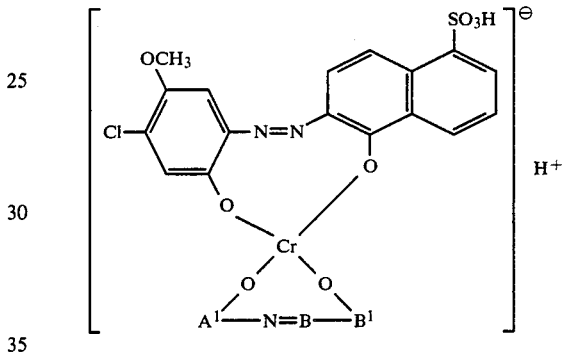

wherein $A^1$ is a benzene or naphthalene nucleus substituted by at least one substituent selected from the group consisting of chlorine, bromine, methyl, ethyl, $C_1$–$C_4$-alkoxy, trifluoromethyl, nitro, $C_1$–$C_4$-alkylsulfonyl, phenylsulfonyl, unsubstituted or substituted carbamyl or sulfamyl and hydroxysulfonyl, and $B^1$ is naphthalene or naphthalene substituted by hydroxysulfonyl, chlorine, bromine, amino, acetylamino or phenylamino.

2. The metal complex dye of claim 1, wherein the reactant for radical $B^1$ in said molecule is 2-naphthol, 6-bromo-2-naphthol, 8-acetylamino-2-naphthol, 5,8-dichloro-1-naphthol, 1-naphthol-5-sulfonic acid, 2-naphthol-6-sulfonic acid, 8-acetylamino-1-naphthol-5-sulfonic acid, 6-phenylamino-1-naphthol-3-sulfonic acid or 7-amino-1-naphthol-3-sulfonic acid.

* * * * *